June 9, 1964  J. FARMER  3,136,348
PINEAPPLE SLICING MACHINE
Filed Dec. 3, 1959  3 Sheets-Sheet 1

Inventor:
John Farmer
By Wilmer Mecklin
his Attorney

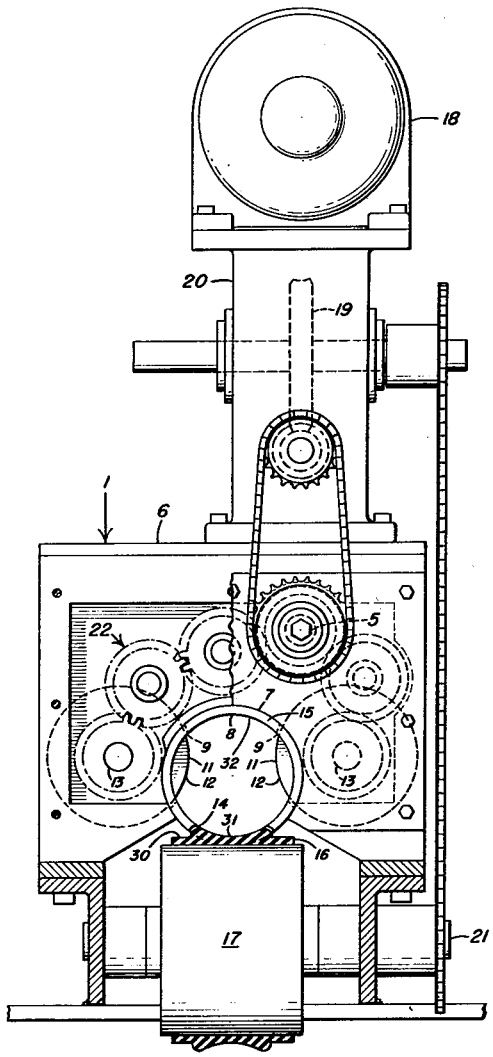

Inventor:
John Farmer
By Wilmer Mechlin
his Attorney

United States Patent Office 3,136,348
Patented June 9, 1964

3,136,348
PINEAPPLE SLICING MACHINE
John Farmer, Kailua, Oahu, Hawaii, assignor to Honolulu Iron Works Company, Honolulu, Hawaii, a corporation of Hawaii
Filed Dec. 3, 1959, Ser. No. 857,035
13 Claims. (Cl. 146—6)

This invention relates generally to slicing machines and more particularly to machines for slicing pineapples and like comparatively soft articles which require lateral support during slicing.

Bacon, pickles and other articles of comparable firmness heretofore have been sliced by progressively feeding each article to a rotary cutter which cuts off one slice from the presented end on each rotation. However, in slicing pineapples and like relatively soft articles, the bacon and similar slicing machines are inappropriate because of the necessity of providing some lateral support during slicing and it has been customary instead to feed such articles individually into a sleeve or casing which provides the necessary lateral support and while the article is at rest in the sleeve to slice it in its entirety in a single operation.

In the case of pineapples, each pineapple, after being cut into a cored cylinder by a "Ginaca" machine, and trimmed of eyes, fragments of the shell, rotten fruit and other undesirable matter, has heretofore been fed into a close-fitting tube interrupted radially by slots spaced at the desired slice thickness and while at rest in the tube is sliced in its entirety by a single stroke of a gang of knives, each of which passes through and is guided by one of the slots. The difficulty with this operation is that even if the blades are staggered, it is practically impossible to prevent overlap in their action on the pineapple, so that there is exerted on the pineapple by each blade a wedging action proportionate to the blade's thickness. This action not only results in rapid dulling of the blades and wear on the tube at the sides of the slots, with consequent expense in maintenance, but causes the slices to be uneven and ragged and, since a pineapple is some 98% liquid, produces a veritable stream of juice as the cells in advance and at the sides of the blades are ruptured by the pressure exerted by the latter. As a consequence of the cell rupture, it has been determined that there is a loss of some 4% of the fruit, even within that portion suitable for packing as slices and not including any fruit so damaged by the knives as to fail to pass inspection for such packing. When there is added to the fruit loss the expense of the maintenance constantly required by the knives and the slotted tubes, the total cost to the pineapple packing industry directly attributable to the present slicing machines is quite appalling.

The primary object of the present invention is to provide an improved machine for slicing pineapples and like articles, which slices without damage to the articles and requires a minimum of maintenance.

Another object of the invention is to provide a machine for slicing pineapples and like articles, which both positively feeds and laterally supports an article during slicing.

An additional object of the invention is to provide a machine for slicing pineapples and like articles which, so long as it is supplied, operates continuously to slice articles intermediate their ends into slices of uniform thickness without damage to the articles.

A further object of the invention is to provide a machine for slicing pineapples and like articles, whereby the articles are enabled to be sliced, a single cut at a time, by a rotary cutter into which they are positively advanced one slice thickness for each rotation of the cutter.

Another object of the invention is to provide a single cut machine for slicing pineapples and like articles, wherein the slicing is performed by a single rotary cutting blade which is of such construction and so guided during slicing as to slice each article evenly and precisely despite concurrent forward feeding of the article.

An additional object of the invention is to provide a machine for slicing pineapples and like articles, the feeding and cutting means of which are synchronized in action and automatically controlled in operation by the feeding of articles to the feeding means and the length of the column of articles being fed to the cutting means.

Other objects and advantages of the invention will appear hereinafter in the detailed description, be particularly pointed out in the appended claims and be illustrated in the accompanying drawings, in which:

FIGURE 2 is a vertical sectional view on an enlarged scale taken along the lines 2—2 of FIGURE 1;

FIGURE 3 is a vertical sectional view on the scale of FIGURE 2 taken along the lines 3—3 of FIGURE 1;

FIGURE 7 is a fragmentary horizontal sectional view taken along the lines 7—7 of FIGURE 3 with portions broken away to more clearly illustrate the preferred form of the cutter.

Figure 1:
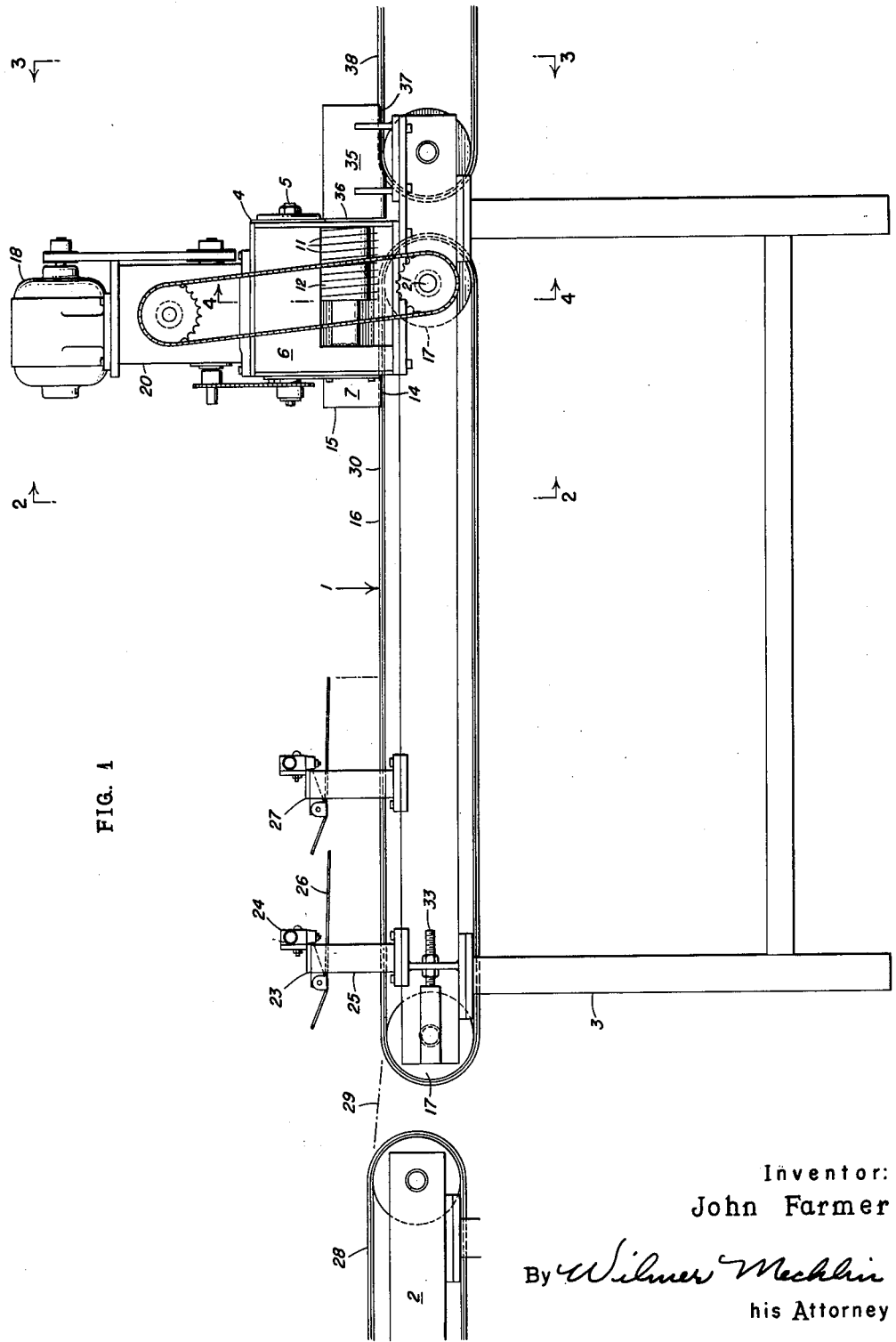
FIGURE 1 is a side elevational view of a preferred embodiment of the slicing machine of the present invention.
Figure 5:
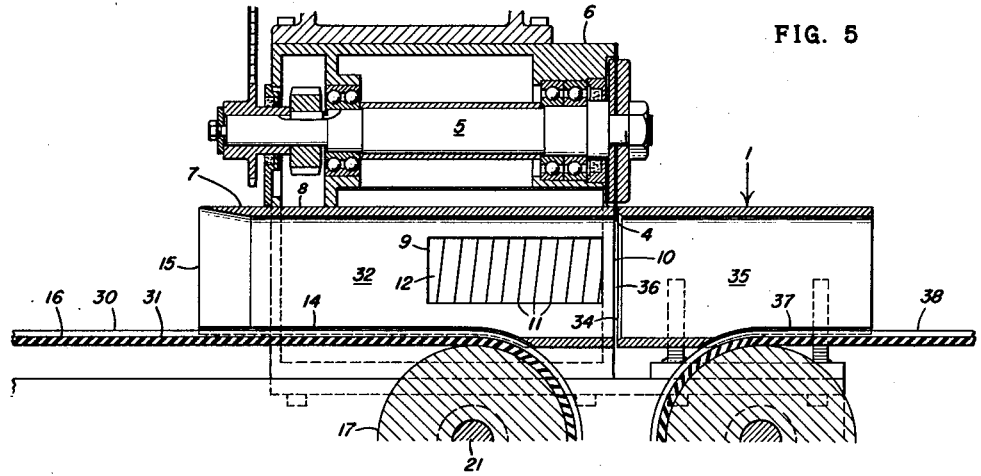
FIGURE 5 is a vertical sectional view taken along the lines 5—5 of FIGURE 4.
Figure 6:
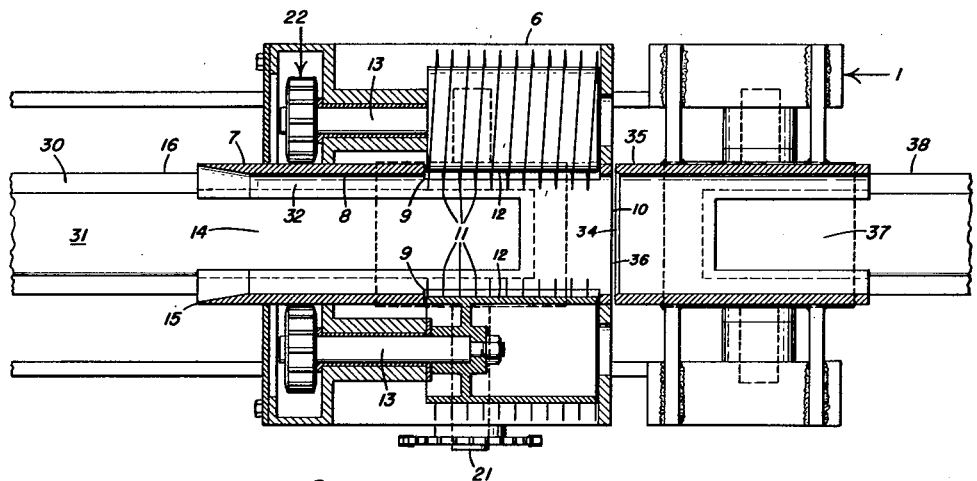
FIGURE 6 is a horizontal sectional view taken along the lines 6—6 of FIGURE 4 except that one of the feed scrolls is shown in full.
Figure 4:
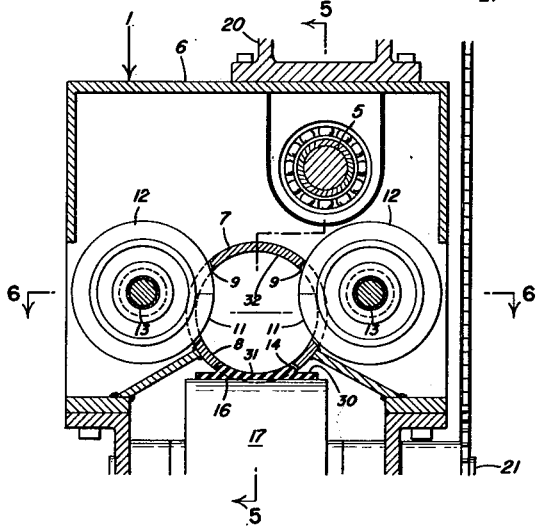
FIGURE 4 is a vertical sectional view on the scale of FIGURE 2 taken along the lines 4—4 of FIGURE 1.

Referring now in detail to the drawings, in which like reference characters designate like parts, the improved slicing machine of the present invention, while applicable to other articles requiring lateral support during slicing due to their relative softness, is particularly adapted and in its illustrated embodiment especially designed for the slicing of pineapples.

As applied to the slicing of pineapples, the improved slicing machine, designated generally as 1, will normally be positioned to receive and slice the pineapples after they have been cut into cored cylinders by a so-called "Ginaca" machine (not shown) and the cylinders have been trimmed of eyes, shreds of skin and other waste on a trimming table indicated in part at 2. Provided with a suitable stand, support or frame 3, the slicing machine 1 is comprised of a rotary cutter or slicer 4 removably or detachably fixed or secured to a spindle 5 at the rear, outlet or discharge end of a housing 6 in which the spindle is journalled. The spindle 5 will usually be disposed horizontally and longitudinally of the machine 1 so that the knife 4 will rotate transversely of the machine about a horizontal axis. In the housing 6, parallel to and preferably below the spindle 5, is a sleeve, casing or tube 7 of a cross-sectional shape and dimension to fit closely the particular articles being sliced, the sleeve, for handling food stuffs, ordinarily being made of stainless steel for easy cleaning and resistance to corrosion and, for pineapples, being cylindrical and of an inside diameter substantially equal to the outside diameter of the pineapples which it is designed to slice.

Radially included by or within the ambit or path of the cutter 4, the sleeve 7 has its side wall 8 interrupted by one or preferably a pair of substantially diametrically opposed slots 9 extending longitudinally or axially of the sleeve toward but desirably terminating short of or adjacent the latter's rear, outlet or discharge end 10. Interrupting opposite sides of the side wall 8 intermediate the ends of the sleeve 7, the slots 9 of the preferred pair are each designed to accommodate or receive and permit a helical or helix-wound flight or thread 11 of a rotary feed or drive scroll or screw 12 to project laterally or radially into the portion of the sleeve interrupted by the slot. Oppositely wound and rotating and here cylindrical, the feed scrolls 12 are each of a length to grip and positively feed a pineapple in the sleeve 7 and are mounted on shafts 13 journalled in the housing 6 at opposite sides of the sleeve for rotation on axes parallel to the sleeve's axis or longitudinal center line. The sleeve 7 also is interrupted or cut away, this time at the bottom, by a slot 14 opening onto the sleeve's front, inlet or feed end 15 and extending rearwardly therefrom longitudinally or axially of the sleeve into longitudinally overlapping relation with the scroll-receiving slot or slots 9. Disposed, circumferentially of the sleeve, between the slots 9, this last slot 14 is designed to receive the rear or outlet end portion of a feed conveyor 16 preferably in the form of an endless rubber or like belt riding and adapted to move longitudinally of the slicing machine 1 from the inlet or feed end of the latter into the sleeve on rollers or pulleys 17 mounted at the same level on and disposed transversely of the frame 3 so that the advance or feed flight of the belt is substantially horizontal or level and parallel to the axis of the sleeve.

The cutter 4, scrolls 12 and feed belt 16 are designed to be synchronized or coordinated in drive such that a pineapple will be advanced, fed or moved the thickness of one slice for each cut of the cutter 4, to enable the cutter, on each cut, to cut off a slice from the presented end of a pineapple of a thickness predetermined or controlled by the rate of feed. This synchronization or coordination of drive conveniently is here accomplished by driving these several members or components by a single electric motor 18 through reduction gearing 19 housed in a gear box 20 supported on the cutter housing 6 and supporting the motor, the reduction gearing being drivably connected, through suitable take-offs, to the spindle 5 of the cutter 4, the axle 21 of the adjacent, underlying or driven of the rollers 17 carrying the feed belt 16 and, through a gear train 22 housed in the cutter housing 6, to the shafts 13 of the feed scrolls 12.

In order that its operation may be controlled automatically by delivery or feeding of pineapples to it from the trimming table 2, the illustrated slicing machine 1 is provided, adjacent the feed end of the feed belt 16, with a sensing, triggering or tripping device 23, here in the form of a normally open microswitch 24 mounted on the stand 3 above the feed belt on a mounting bracket 25 and having a switch arm or blade 26 pivoted to the bracket 25 and having a switch arm or blade 26 pivoted to the bracket and disposed to be engaged and swung to close the switch by a pineapple delivered to the feed belt from the trimming table. Wired in the circuit of the motor 18, the switch 24 on closing will automatically start the slicing machine. A time delay in the circuit or a separate similar switch mounted adjacent the sleeve might be used to hold the motor circuit closed to ensure that any pineapple delivered to the feed belt 16 would be sliced by the cutter 4. However, to aid in backing up the end pineapple being sliced, it ordinarily will be preferred that the slicing machine 1 continue to operate only so long as a continuous column of pineapples of a predetermined length is being fed to the cutter 4. For this purpose, there is mounted on the stand 3 intermediate the first or starter switch 24 and the sleeve 7 and at the predetermined distance or spacing in advance of the sleeve a second or holding switch 27 similar in construction to the first and connected or wired in parallel with the starter switch in the motor circuit so that the latter will be closed so long as either switch is closed.

Usually driven somewhat slower, about 10%, than the delivery conveyor or belt 28 on the trimming table 2, to compensate for any gaps in loading, and receiving or supplied with pineapples from that conveyor across a connecting slide or chute indicated at 29, the feed belt 16 is designed to center a pineapple on the guide sleeve 7, as well as to feed it into the sleeve into engagement with the feed scrolls 12. This is readily accomplished by disposing the feed belt in longitudinal alignment with and parallel to the axis of the sleeve and forming in the outer face 30 of the belt a continuous, longitudinally extending, cylindrically concave groove 31. Not only is the groove 31 centered laterally on the sleeve 7, but, within the belt slot 14 to the point of its overlap of the belt and the feed scrolls 12, it is so positioned, vertically and laterally by the rollers 17, as to conform to or be concentric and coradial with the inner surface 32 of the sleeve 7. A pineapple, as it is carried by the feed belt 16, thus fits neatly in the conforming or substantially coradial groove 31 and on reaching the close fitting sleeve 7 is centered thereon and driven thereinto into engagement with the feed scrolls 12, entry of pineapples into the sleeve, if desired, being facilitated by flaring the front end 15 of the latter.

Maintained taut by adjustment of a suitable slack adjuster 33 connected to one of its rollers 17, here the front or idler roller, the feed belt 16 has accomplished its main purpose when it has fed or advanced a pineapple into the sleeve 7 into engagement with the feed scrolls 12. It thereafter is the function of the preferred pair of oppositely wound and rotating feed scrolls 12 to grip or engage and positively feed or advance each pineapple to the cutter 4 at the same rate as the advance on the feed belt, one slice thickness for each rotation of the cutter.

Were the cylinders of pineapple, as delivered to the slicing machine, fit in their entireties for packing as slices and each a multiple in length of the required slice thickness, suitable means could be provided in advance of the sleeve 7 for individually indexing the pineapples so that every slice would be of the proper thickness. However, the wide variations in the size and shape of pineapples make it practically impossible to cut them into cylinders of particular lengths in the "Ginaca" machines and, after the trimming on the trimming table 2, the end portions are almost invariably unfit for the slice pack. It, therefore, is not essential to control the thickness of the end slices on each pineapple and only necessary that each be sliced intermediate its ends into precise slices of uniform thickness. For this task, the illustrated slicing machine, with its direct transfer from the feed belt 16 to the feed scrolls 12 and positive drive by the latter to the cutter 4, is well adapted.

So long as they are synchronized to advance a pineapple one slice thickness for each cut of the cutter 4, the feed scrolls 12 may be of any pitch appropriate to their speeds of rotation. However, if the cutter 4 is single-bladed, it usually will be preferable to make the pitch of the flights or helices 11 of the scrolls exactly equal to the desired slice thickness and to rotate or drive the scrolls at the same speed as the cutter. It also is desirable that the scrolls, like the sleeve 7, be made of stainless steel or similar noncorrosive material. Even though the effect is small due to the radial direction of the pineapple fibres, it is desirable, as well, to hold the thickness of the flights and their radial penetration or cut into the pineapples to minima consistent with long service life and absolute control of the feeding, a thickness of about .020 in. and penetration of around .5 in. being suitable for both purposes.

It has been mentioned that the scroll-receiving slots 9 terminate short of the rear or downstream end or face 10 of the sleeve 7. This enables the sleeve to fit closely about the entire circumference or periphery of each pineapple immediately in advance of the cutter 4 and provide the lateral bracing, support or stability required to prevent lateral yielding of the relatively soft material during slicing and consequent unevenness of the slices.

The circumferential continuity of the rear end 10 of the sleeve also enables that end to be flat and perpendicular or normal to the axis of the cutter so that the end can serve as a guide for the cutter as the latter slices through a pineapple. In this the end 10 preferably is assisted by a confronting, correspondingly flat and continuous end 34 of a discharge sleeve, casing or tube 35 conveniently mounted on the stand 3 beyond the cutter 4 and concentric and coradial with or of the same cross-section as the guide or feed sleeve 7. Parallel and spaced substantially the thickness of the cutter 4, the confronting ends 10 and 34 together define a guide slot 36 for the cutter.

The illustrated discharge sleeve 35 is interrupted at the bottom by a rearwardly opening slot 37 for receiving a discharge conveyor or belt 38 onto which it directs the slices cut from the presented ends of the pineapples, the discharge belt being driven somewhat faster than the feed belt 16 so as to prevent the slices from backing up against the cutter.

In the preferred embodiment, the rotary cutter 4 has a single blade 39 and is fed pineapples at the rate of a single slice thickness for each rotation. However, the cutter may have a plurality of blades, the paths of which are either coincident or spaced axially of the spindle 5 and nonetheless may slice or cut off a slice of pineapple of a predetermined thickness on each cut or slice. The requirements in such case are that the plurality of blades have their pineapple-engaging or cutting or slicing areas circumferentially spaced or nonoverlapping and that this spacing and, if their paths are not coincident, their circumferential and axial spacing, be such that a pineapple will have been advanced a distance equal to the predetermined slice thickness, between passes or sweeps of succeeding or consecutive blades across the path of a pineapple or rear end or face 10 of the sleeve 7. If the cutter 4 not only is plural-bladed but its blades have non-coincident, axially spaced paths, the single guide slot 36 of the illustrated embodiment will, of course, not suffice, but guidance of the additional blades in the desired manner is simply a matter of providing, in the feed sleeve 7, in advance of the slot 36, one or more additional such slots, each for one of the extra blades. With the cutter 4, whether single or plural-bladed, fed at the rate of a single slice thickness for each cut or slice and, if plural-bladed, having no circumferential overlap between its blades, the slicing machine of this invention, as opposed to previous pineapple slicing machines with their multi-bladed gang cutters, requires no allowance for blade thickness and is controlled in the thickness of the slices by the rate at which pineapples are fed to the cutter. Too, the slices are taken off the ends of the pineapples and these slices, as cut, are carried away by the discharge belt and preferably pushed away, as well, by bevelling or sharpening the leading or cutting edge 40 of the or each blade 39 from its back or discharge side.

The cutter 4 of this invention would exert no appreciable wedging action on a pineapple with resultant cell rupture even though its blade or blades 39 were rather thick. Nonetheless, if, as is preferred to simplify forming and sharpening, the blade of the single-bladed cutter or each blade of the alternative plural-bladed cutter is flat in a plane normal to the axis or longitudinal center line of the sleeve 7, rather than formed as a helix to follow the forward progress or movement of a pineapple under drive of the feed scrolls 12, it is desirable that the thickness of the blade and the cutting or slicing arc which it describes in slicing through a pineapple be kept as small as possible. Accordingly, the preferred flat blade is on the order of .05 in. thick and its cutting arc, as determined by its radius and shear angle, is about 50°. Such a blade, wider at the root than at the tip for strength and swept or arched backwardly toward its tip for a sweeping cutting motion, in the present slicing machine, cuts a pineapple intermediate its ends, cleanly and precisely into slices of 0.5 in. or other desired uniform thickness. This unifority is both collective and individual with no variations in thickness either between separate slices or between the sides and the core of a given slice.

From the above detailed description, it will be apparent that there has been provided an improved slicing machine which is adapted for slicing pineapples and like articles and cuts the articles cleanly and without damage into slices of uniform thickness. It should be understood that the described and disclosed embodiment is merely exemplary of the invention and that all modifications are intended to be included which do not depart from either the spirit of the invention or the scope of the appended claims.

Having described my invention, I claim:

1. A slicing machine comprising sleeve means for receiving an article to be cut, said sleeve means closely fitting and laterally supporting said article during cutting thereof, a rotary cutter for cutting an article in said sleeve means a single slice at a time, means projecting laterally into said sleeve means for engaging and positively feeding an article therein at a predetermined rate to said cutter, and a feed belt aligned longitudinally with and extending into said sleeve means for feeding said article into said sleeve means into engagement with said feeding means.

2. A slicing machine comprising sleeve means for receiving an article to be cut, said sleeve means closely fitting and laterally supporting said article during cutting thereof, a rotary cutter for cutting an article in said sleeve means one slice at a time, rotary scroll means projecting laterally into said sleeve means for laterally engaging and positively feeding an article therein at a predetermined rate to said cutter, and a feed belt extending into said sleeve means for feeding said article at said predetermined rate into said sleeve means into engagement with said scroll means.

3. A slicing machine comprising sleeve means for receiving an article to be cut, said sleeve means closely fitting and laterally supporting said article during cutting thereof, a rotary cutter for cutting an article in said sleeve means a single slice at a time, rotary scroll means projecting laterally into said sleeve means for laterally engaging and postively feeding an article therein at a predetermined rate to said cutter, and a feed belt extending into said sleeve means and longitudinally overlapping and synchronized in drive with said scroll means for feeding said article at said predetermined rate into said sleeve means into engagement with said scroll means.

4. A slicing machine comprising sleeve means for receiving an article to be cut, said sleeve means closely fitting and laterally supportnig said article during cutting thereof, a rotary cutter for cutting an article in said sleeve means a single slice at a time, rotary scroll means projecting laterally into said sleeve means for laterally engaging and positively feeding an article therein at a predetermined rate to said cutter, a feed belt extending into said sleeve means and longitudinally overlapping and synchronized in drive with said scroll means for feeding said article at said predetermined rate into said sleeve means into engagement with said scroll means, and sensing means disposed along said feed belt in advance of said sleeve means for automatically controlling operation of said slicing machine in dependence upon the presence of articles on said feed belt.

5. A slicing machine comprising sleeve means for receiving an article to be cut, said sleeve means closely fitting and laterally supporting said article during cutting thereof, a rotary cutter for cutting an article in said sleeve means a single slice at a time rotary scroll means projecting laterally into said sleeve means for laterally engaging and positively feeding an article therein at a predetermined rate to said cutter, a feed belt extending into said sleeve means and longitudinally overlapping and synchronized in drive with said scroll means for feeding said article at said predetermined rate into said sleeve means into engagement with said scroll means, sensing means disposed adjacent an inlet end of said feed felt for automatically starting said slicing machine on delivery of an article to said feed belt, and means disposed along said feed belt intermediate said sensing means and sleeve means at a predetermined spacing from said sleeve means for shutting off said slicing machine in absence of a column of articles of a length determined by said spacing between said last-named means and said cutter.

6. A slicing machine comprising sleeve means for receiving an article to be cut, said sleeve means closely fitting and laterally supporting said article during cutting thereof, a rotary cutter for cutting an article in said sleeve means a single slice at a time, rotary scroll means projecting laterally into said sleeve means for laterally engaging and positively feeding an article therein at a predetermined rate to said cutter, a feed belt extending into said sleeve means and longitudinally overlapping and synchronized in drive with said scroll means for feeding said article at said predetermined rate into said sleeve means into engagement with said scroll means, sensing means disposed adjacent an inlet end of said feed belt for automatically starting said slicing machine on delivery of an article to said feed belt, and sensing means wired in parallel with said first-named sensing means and disposed along said feed belt intermediate said first-named sensing means and sleeve means at a predetermined spacing from said sleeve means for shutting off said slicing machine in absence of a column of articles of a length determined by said spacing between said last-named means and said cutter.

7. A slicing machine comprising a guide sleeve closely fitting articles to be sliced, a rotary cutter for cutting an article in said sleeve a single slice at a time and having a fixed axis disposed parallel to said sleeve, a pair of oppositely wound scrolls rotatable in opposite directions about axes parallel to said cutter axis and projecting from opposite sides into said sleeve intermediate ends thereof for laterally engaging and positively feeding an article therein to said cutter, a feed belt extending into said sleeve between and longitudinally overlapping said scrolls for feeding an article into said sleeve into engagement with said scrolls, said belt having an outer face conforming in contour to and within said sleeve concentric with an inner surface thereof for centering said article on said sleeve, and means for driving said feed belt and scrolls at a rate to advance said article a predetermined slice thickness for each slice cut by said cutter.

8. A slicing machine comprising a sleeve having a continuous rear end disposed in a plane substantially normal to a longitudinal center-line thereof, a single flat blade radially including said end and rotatable in a plane parallel thereto, scroll means projecting laterally into said sleeve intermediate ends thereof and rotatable parallel to said center-line for laterally engaging and feeding an article to said blade, and a feed belt extending longitudinally of said sleeve and projecting into a front end thereof into longitudinally overlapping relation with said scroll means for feeding an article into said sleeve into engagement with said scroll means, said blade, scroll means and feed belt being syncronized in drive to feed an article by said feed belt and scroll means at a predetermined rate for each rotation of said blade.

9. A slicing machine comprising sleeve means of a cross-section to fit closely an article to be sliced, a guide slot radially interrupting said sleeve means, a single flat blade rotatable through and of a thickness substantially equal to the width of said guide slot, rotary feed means projecting laterally into said sleeve means intermediate a front end thereof and said slot for laterally engaging and positively feeding an article in said sleeve means to said blade, and a feed belt extending longitudinally of said sleeve means and projecting into said front end thereof into longitudinally overlapping relation with said rotary feed means for feeding an article thereto, said rotary feed means and feed belt being synchronized with said blade for feeding an article thereto at a predetermined rate for each rotation of said blade.

10. A pineapple slicing machine comprising a cylindrical sleeve of a diameter to fit closely a pineapple to be sliced, a fixed axis rotary cutter for cutting a pineapple in said sleeve a single slice at a time, a pair of oppositely wound scrolls rotatable in opposite directions about axes parallel to said cutter axis and projecting from opposite sides into said sleeve intermediate ends thereof for laterally engaging and positively feeding a pineapple therein to said cutter, a feed belt extending into said sleeve between and longitudinally overlapping said scrolls for feeding an article into said sleeve into engagement with said scrolls, said belt having an outer face conforming in contour to and within said sleeve concentric with an inner surface thereof for centering said article on said sleeve, means for driving said cutter, scrolls and feed belt, and means for synchronizing said drive to feed said pineapple by said feed belt and scrolls at a rate to advance said pineapple a predetermined slice thickness for each slice cut by said cutter.

11. A machine for slicing pineapples comprising a fixed sleeve for receiving a pineapple cylinder to be sliced, said sleeve closely fitting and laterally supporting said cylinder during slicing thereof, a rotary cutter for radially cutting said cylinder in said sleeve a single slice at a time, means projecting laterally into said sleeve and operating continuously during slicing of said cylinder for laerally engaging and positively feeding said cylinder therein at a predetermined rate to said cutter, and a feed conveyor for feeding said cylinder into said sleeve and into engagement with said feeding means.

12. A machine for slicing pineapples comprising a sleeve internally of substantially the same cross-section as a pineapple cylinder to be sliced for receiving and laterally supporting said cylinder during slicing thereof, a rotary cutter for radially slicing said cylinder in said sleeve a single slice at a time, scroll means for laterally engaging and positively feeding said cylinder in said sleeve to said cutter at the rate of a single slice thickness for each slice sliced by said cutter, and slot means radially interrupting said sleeve for guiding said cutter during slicing thereby of said cylinder.

13. A machine for slicing pineapples comprising a fixed cylindrical sleeve for receiving a pineapple cylinder to be sliced, said sleeve closely fitting and during slicing laterally supporting said cylinder, a rotary cutter for radially slicing said cylinder in said sleeve a single slice at a time, means synchronized with said cutter and operating continuously during slicing of said cylinder thereby for laterally engaging and positively feeding said cylinder in said sleeve to said cutter, and means for feeding said cylinder to said sleeve and into engagement with said positive means.

References Cited in the file of this patent
UNITED STATES PATENTS

| | | |
|---|---|---|
| 516,399 | Morral | Mar. 13, 1894 |
| 1,519,158 | Napier et al. | Dec. 16, 1924 |
| 1,900,252 | Morgan | Mar. 7, 1933 |
| 1,939,741 | Van Berkel | Dec. 19, 1933 |
| 1,991,304 | Walter | Feb. 12, 1935 |
| 2,037,724 | Jacobs et al. | Apr. 21, 1936 |
| 2,752,968 | Toby | July 3, 1956 |